United States Patent [19]

Westermann

[11] 4,036,799
[45] July 19, 1977

[54] COMPOSITIONS CONTAINING POLYCHLOROPRENE

[75] Inventor: Peter Henry Westermann, Dorking, England

[73] Assignee: The British Petroleum Company Limited, London, England

[21] Appl. No.: 661,606

[22] Filed: Feb. 26, 1976

[30] Foreign Application Priority Data

Mar. 7, 1975 United Kingdom ............... 9564/75

[51] Int. Cl.$^2$ .................. C08L 91/00; C08F 14/02; C08C 19/20
[52] U.S. Cl. .................. 260/28.5 B; 260/28.5 AS; 260/29.1 R; 526/1; 526/17; 526/53; 526/30
[58] Field of Search .............. 260/28.5 AS, 28.5 B, 260/29.1 R; 526/1, 17, 53

[56] References Cited

U.S. PATENT DOCUMENTS

| 3,639,583 | 2/1972 | Cardarelli et al. | 260/28.5 B |
| 3,812,203 | 5/1974 | Kadowaki et al. | 260/29.1 R |

Primary Examiner—Melvyn I. Marquis
Attorney, Agent, or Firm—Brooks, Haidt, Haffner & Delahunty

[57] ABSTRACT

Polychloroprene blends contain 3 – 300 parts by weight of polychloroprene of hardened extract. They may be produced by mixing latices.

16 Claims, No Drawings

COMPOSITIONS CONTAINING POLYCHLOROPRENE

The present invention relates to volcanisable compositions containing polychloroprene, and to cured products made from the compositions.

USSR Pat. No. 375,302 discloses a composition comprising polychloroprene, bitumen and a vulcanising agent, together with a solvent and stannic chloride as a mastic. The mastic may be used as a coating on concrete and metal and vulcanises in situ to give a cured layer.

The composition described in the USSR patent is a mastic intended to provide a coating on a supporting surface and would not be suitable for a forming operation e.g. moulding carried out at elevated temperatures to produce a cured article. The production of articles by high temperature vulcanisation, rather than the production of mastics is the principal use of rubbers however, and it is of course desirable to be able to make blends of rubbers such as polychloroprene with other cheaper materials if this can be done without excessively impairing the desirable properties of the rubber. Bitumen is a cheap readily available material. However when blends of bitumen and the polychloroprene are prepared and vulcanised by heating it is found that the resulting product has the very great disadvantage of staining anything it comes into contact with. Furthermore, when attempts are made to increase the amount of bitumen beyond a certain limit there is a great deterioration in physical properties. The blending of bitumen with polychloroprene to give products which are vulcanisable on heating does not therefore give particularly satisfactory results.

There is a product available which has a certain superficial resemblance to bitumen in that it is a black material with relatively low softening point produced as a by-product of petroleum refining. This material is 'hardened extract'(which is described in more detail below). This material, although cheaper than polychloroprene, is considerably more expensive than bitumen and is not so widely available. There is no reason from the prior art to believe that this material would show any improvement over bitumen in blends with polychloroprene, and clearly it would be foolish to use a more expensive material in place of bitumen if not advantage can be expected from such a replacement.

We have now found that blends of polychloroprene and hardened extract can be produced which show properties which are superior to these of blends of polychloroprene and bitumen.

Accordingly the present invention provides a vulcanisable composition comprising polychloroprene and 3 to 300 parts by weight, per 100 parts by weight of polychloroprene, or 'hardened extract' (as hereinafter defined) having a saturated hydrocarbon content of not more than 10% by weight.

According to another aspect of the present invention there is provided a vulcanisable composition comprising polychloroprene and 3 to 300 parts by weight of polychloroprene, of 'hardened extract' having a saturated hydrocarbon content of not more than 10% by weight, and a vulcanisation system.

According to yet another aspect of the present invention there is provided a vulcanised product made by vulcanising a composition comprising (1) polychloroprene, (2) 3 to 300 parts by weight, per 100 parts of polychloroprene, or hardened extract having a saturated hydrocarbon content of not more than 10% by weight and (3) a vulcanisation system.

By 'vulcanisable composition' is meant a composition which either as it is, or on addition of a vulcanisation system can be vulcanised on being subjected to the required temperature.

Throughout this specification 'hardened extract' means a product obtained by blowing air into a petroleum extract at elevated temperature e.g. 250°–350° C, the petroleum extract having been obtained by the solvent extraction of a distillate petroleum fraction boiling in the lubricating oil boiling range e.g. 350°–600° C and containing a major proportion of aromatic hydrocarbons.

Examples of solvents which may be used to extract the distillate petroleum fraction are furfural, phenol and N-methyl pyrrolidone. The distillate subjected to extraction does not contain asphaltenes, and this extraction process must be distinguished from the use of, for example, liquid propane to obtain a product rich in asphaltenes from residues, which is sometimes described as a 'solvent' process.

Examples of such petroleum extracts are materials sold under the designation 'Enerflex' Process Oils by BP Oil Ltd., London. Particular examples of petroleum extracts suitable for air blowing are Enerflex 65 and Enerflex 96 particularly Enerflex 96. It is preferred that the hardened extract is prepared from a petroleum extract having a content of 'saturates' and 'aromatics' as determined by molecular-type analysis (clay-gel) ASTM D2007, of less than 15% wt/wt more preferably less than 10% wt/wt for saturates and preferably greater than 75% wt/wt, more preferably greater than 80% wt/wt for aromatics.

The 'hardened extract' resulting from the air blowing referred to above is a solid material at room temperature. In order to obtain a hardened extract having the desired low content of saturated hydrocarbon it may be necessary to select a petroleum extract in which the saturated hydrocarbon content is low. the choice of a suitable petroleum extract can readily be made by the man skilled in the art on the basis of simple tests. The blowing with air may be carried out in the presence of a catalyst e.g. a metal halide Friedel-Crafts catalyst such as ferric chloride, or without a catalyst.

The hardened extracts used in the present invention are to be distinguished from bitumens. When crude oil is distilled to remove materials boiling up to the end of the gas oil range, the resulting residue known as atmospheric residue, can be subjected to vacuum distillation to recover waxy distillates. The residue from this vacuum distillation, known as vacuum residue, is a bitumen. Alternatively residue (either atmospheric or vacuum) may be treated with for example liquid propane to precipate a bitumen layer.

The composition of hardened extracts and bitumens may be determined on the basis of their content of certain classes of material, namely 'asphaltenes', 'toluene insolubles', 'saturates', 'cyclics' and 'resins'. In this method asphaltenes are defined as that fraction which is precipitated by a large excess of n-heptane but which is soluble in toluene. Toluene insolubles are that fraction which is insoluble in toluene. Saturates are defined as that fraction which is eluted by n-heptane from an alumina/silica gel column, cyclics at that fraction which is eluted by toluene, and resins as that fraction which is eluted by a 50/50 toluene/absolute ethanol mixture.

Typical data on hardened extracts and bitumens are given in Table 1 where "HE" means "hardened extract" and the number following "HE" is the softening point. Information is given on two different types of hardened extract, identified as type A and type B.

TABLE 1

| | Broad Chemical Compositon of Blown Bitumen and Hardened Extracts | | | | | | | |
|---|---|---|---|---|---|---|---|---|
| | Straight run bitumen Kuwait | 115/15 Blown Kuwait bitumen | HE 60 Type B | HE 90 Type B | HE 150 Type B | HE 170 Type B | HE 100 Type A | HE 150 Type A |
| Softening Point Ring and Ball °C | 85 | 115 | 60 | 90 | 150 | 170 | 100 | 150 |
| Penetration at 25° C mm/10 | — | 15 | 15 | 5 | <1 | <1 | <1 | <1 |
| Composition % wt. Saturates | 10.0 | 18.1 | 7.4 | 6.4 | 4.9 | Not known | 2.0 | 0.8 |
| Cyclics | 55.3 | 33.2 | 51.3 | 45.4 | 30.3 | " | 46.0 | 34.0 |
| Asphaltenes | 7.1 | 32.5 | 23.9 | 28.8 | 55.8 | " | 25.0 | 20.0 |
| Resins | 26.1 | 14.9 | 16.4 | 15.1 | 8.8 | " | 17.0 | 13.0 |
| Toluene insolubles | 1.5 | 2.1 | 1.0 | 4.3 | 0.2 | " | 11.0 | 34.0 |

It will be seen that both type A and type B hardened extracts have lower saturated hydrocarbon contents and higher asphaltenes and insolubles contents than either striaght run or blown bitumens of equivalent softening point. Preferably the hardened extracts used have asphaltene plus insolubles contents of at least 20% by weight and saturates contents of less than 10% by weight. Preferably the content of asphaltenes along is at least 20% by weight.

Hardened extracts are available having a range of softening points. Thus hardened extracts having softening points ranging from 50° C to 200° C may be used. It is preferred to use hardened extracts having a softening point of in the range 85°-170° C. The softening point of hardened extract is measured by the ring and ball test used to determine the softening point of bitumens. This is described in Chapter 13 page 12 of "Petroleum Products Handbook" edited by Guthrie and published 1960 by McGraw Hill.

The polychloroprene rubber or rubber latex used in the process of the present invention may be any polychloroprene capable of being vulcanised.

The polychloroprene rubber or rubber latex may be prepared in any convenient manner. The polychloroprene rubber may be a sulphur-modified polychloroprene rubber made by polymerizing chloroprene in the presence of sulphur, or a mercaptan-modified polychloroprene made by polymerizing chloroprene in the presence of a mercaptan such as alkyl mercaptan. Alternatively the polychloroprene may be a xanthogen-modified polychloroprene rubber made by polymerising in the presence of a dialkyl xanthogen disulphide, or may be made using mixtures of sulphur and/or mercaptan or dialkyl xanthogen disulphide.

The polychloroprene may optionally contain units derived from a comonomer. Thus comonomers such as styrene or 2,3-dichlorobutadiene may be used to modify such polymer properties as rate of crystallisation. The quantity of comonomer used preferably is not more than 15% by weight of the total monomeric material, more preferably not more than 10% by weight of the monomeric material.

Methods of making polychloroprene rubber latices are well-known to those skilled in the art. The polymerisation is preferably carried out in such a way that the polymers on isolation from the latex, have a Mooney viscosity (ML1+4) of from 30 to 120 more particularly 35 to 55.

The preferred weight ratio of hardened extract to polychloroprene will depend upon the purpose for which the composition is to be used. Hardened extract is cheaper than polychloroprene and the maximum quantity of hardened extract will be used consistent with the desired properties being obtained. It is preferred to used at least 5, preferably at least 10, more preferably at least 25 parts by weight of hardened extract per 100 parts by weight of polychloroprene. The present invention is particularly advantageous when making compositions containing more than 100 parts of hardened extract per 100 parts of polychloroprene as the physical properties of vulcanised compositions containing large amounts of hardened extract are particularly favourable when compared with the properties of vulcanised blends in which the hardened extract is replaced by the same amount of bitumen. Thus when making cheap blends which still have surprisingly good physical properties it may be desirable to make a blend containing more than 120 parts of hardened extract, and preferably not more than 200 parts of hardened extract, per 100 parts of polychloroprene. When maximum tensile strength is required, rather than the cheapest composition with useful properties, it is preferable to use not more than 150 parts, more preferably no more than 120 parts by weight of hardened extract per 100 parts by weight of polychloroprene. The use of large properties of hardened extract of low softening point may give a product which is difficult to process in unvulcanised form on conventional rubber processing machinery. Thus it is preferred to use less than 200 parts, for example less than 150 parts by weight of hardened extract of 90° C softening point per 100 parts by weight of polychloroprene, while it is preferred to use less than 100 parts, for example less than 50 parts by weight of 60° softening point hardened extract per 100 parts by weight of polychloroprene.

As with conventional polychloroprene, the compositions of the present invention are vulcanised in order to convert them to useful products. Many vulcanisation systems are known and can be used with the present compositions provided that the hardened extract does not inhibit the vulcanisation reaction. The suitability of a given vulcanisation system is readily determined by experiment. It has been found however that it is particularly preferred to use blends of hardened extract and polychloroprene containing sulphur. The sulphur may be incorporated in the polymer during its production as in the case of sulphur-modified polychloroprene. Alternatively in the case of mercaptan modified and xanthogen modified polychloroprene, sulphur may be added to the blend to be vulcanised. It is also particularly useful to add an accelerator to the blend for example ethylene thiourea. In the case of mercaptan modified polychloroprene it may be necessary to add additional vulcanising agents such as DOTG (di-o-tolylguanidine) and tetramethyl thiuram monosulphide.

The composition may contain other polymers in addition to the polychloroprene.

The composition may contain a minor proportion (i.e., 25% by weight or less) of bitumen by weight of hardened extract.

The compositions of the present invention may contain additives, fillers and extenders conventionally used in the polychloroprene rubber art, for example carbon black, finely divided calcium carbonate or clay, anti-oxidants, magnesia, aromatic oils. The process oil referred to above may be any of the process oils well known in the rubber processing art suitable for use with polychloroprene.

The solid hardened extract and solid polychloroprene may be blended by mixing at a moderately elevated temperature preferably from 80° to 140° C. It is believed that there is some interaction between the hardened extract and the polychloroprene and that this interaction is promoted by heating the blend.

An alternative method of incorporating hardened extract into polychloroprene rubber comprises mixing an aqueous emulsion of hardened extract with a latex of a polychloroprene rubber to give a polychloroprene/-hardened extract latex blend, and recovering solid polychloroprene rubber incorporating the hardened extract from the blend.

The aqueous emulsion of hardened extract may be prepared in any convenient manner, for example by ball-milling the hardened extract in water in the presence of an emulsifier which, for example, may be a resin acid soap. In order to produce a mixed latex when the emulsion of hardened extract is mixed with the polychloroprene latex the emulsifier used in the preparation of the hardened extract emulsion must be compatible with the emulsifier used to prepare the polychloroprene latex i.e. the emulsifiers must not adversely effect each others capability to maintain the stability of the mixed latices.

The quantity of water used to prepare the hardened extract emulsion in relation to the quantity of hardened extract used may vary over a moderately wide range. It is preferred to avoid having too low a concentration of hardened extract in the emulsion as this results in excessive dilution of the polychloroprene latex when the hardened extract emulsion is mixed with it. It is preferred to use sufficient hardened extract to give a solids content at least 25% by weight, based on weight of water, more preferably at least 40% by weight, based on weight of water. The maximum amount of hardened extract which may be introduced into the hardened extract emulsion is limited by the problem of maintaining a stable emulsion at high solids contents, but may for example be 60% by weight.

The hardened extract emulsion and the polychloroprene latex may be mixed together simply by stirring them together.

The solid polychloroprene rubber incorporating the hardened extract may be recovered by the Freeze coagulation method well-known for use in the recovery of polychloroprene rubbers, and described in U.S. Pat. No. 2,187,146.

In the free-coagulation method the latex is brought into contact with a chilled rotating freeze-roll on which a film of polychloroprene rubber mixed with ice forms. The film is continuously removed from the freeze-roll and passed on for further treatment in which the ice is melted, the polymer is washed with water, and the washed polymer is dried.

It may be desirable to reduce the effectiveness of the emulsifier or emulsifiers present in the latex before subjecting it to freeze-coagulation. In the case of emulsifiers which are salts of weak acids e.g. rosin acid soaps, this may be done by adding a small quantity of a stronger acid e.g. acetic acid. However, the effectiveness of the emulsifier should not be so reduced that the latex coagulates otherwise than on the chilled surface.

The process of the present invention is of particular value when the coagulated rubber is recovered continuously as a thin sheet by coagulation on a chilled rotating roller.

The vulcanisation system may be incorporated at the time the hardened extract and polychloroprene are mixed together, in which case either it should be inactive at the mixing temperature, or the time of mixing should be short compared with the time required for vulcanisation. Preferably the vulcanising system is mixed into the composition after the hardened extract and polychloroprene have been blended together.

The composition containing the vulcanisation system is subjected to a forming operation e.g. compression moulding or extrusion or calendering before or at the same time that it is vulcanised to achieve the desired final properties. The vulcanising system is preferably one which is activated by heating. The time and temperature to be required for vulcanisation can be readily determined by simple tests.

Vulcanisates of polychloroprene/hardened extract blends are characterised by good tensile and tear strength, good elongation at break, freedom from undesirable tack at room temperature and good low temperature properties. In addition they exhibit low resilience and have the property of absorbing a high proportion of applied energy when deformed. Compositions of the present invention may thus be used as membranes for water storage, and in applications such as sound absorption and vibration or oscillation damping devices.

Vulcanisates of polychloroprene/bitumen generally have lower tear strengths than those of polychloroprene/hardened extract of equivalent softening point, particularly at high contents of bitumen and hardened extract, and they suffer from undesirable tackiness and cause sever staining of materials they come in contact with.

The invention will now be illustrated by reference to the following examples.

EXAMPLES

Formulations of polychloroprene/hardened extract and polychloroprene/bitumen compositions and the test results obtained on vulcanised sheets are contained in Table 2.

EXAMPLES 1 to 5

Compositions of polychloroprene with 60° or 90° C softening point hardened extract were prepared by compounding the required quantites of polychloroprene and hardened extract in a Brabender rubber mixing head at 80° to 90° C for 15 to 30 minutes. When a homogenous mix had been obtained the remaining ingredients (anti-oxidant, metal oxides, curatives) were added and mixing continued for a further 3 to 5 minutes.

Composition from Examples 1, 2, and 5 were milled for 5 minutes on a cold mill but compositions from Example 2 (200 phr of 90° C softening point hardened extract) and Example 4 (100 phr of 60° C softening point hardened extract) were difficult to mill satisfactorily because of their stickiness.

EXAMPLES 6, 7 and 9

Compositions of polychloroprene with 150° or 170° C softening point hardened extract were prepared by compounding the required quantities of polychloroprene and powdered hardened extract in a Brabender rubber mixing head at 120° to 135° C for 5 to 10 minutes to give a homogenous mix. The mix was allowed to cool to below 100° C before the rest of the ingredients were incorporated.

Compositions from Examples 6, 7 and 9 were easily handled on a cold two roll mill and were milled for 5 minutes.

EXAMPLE 8 (Comparative Example)

Polychloroprene was mixed with antioxidant, metal oxides and ethylene thiourea at 85° C for 5 minutes in a Brabender rubber mixing head and then milled for 5 minutes on a 2 roll mill.

EXAMPLE 10

Polychloroprene, finely divided calcium carbonate (Winnofil S, ICI Ltd) and 100° C softening point hardened extract were mixed for 10 minutes at 100°-120° C in a Banbury rubber mixer to give a homogenous mix. The mix was allowed to cool to 100° C before addition of the rest of the ingredients which were mixed in at 100°-130° C for 3 minutes.

The composition was milled on a water cooled 2 roll mill for 10 minutes.

EXAMPLES 11 and 12 (Comparative Examples)

Composition of polychloroprene with 115/15 bitumen were prepared by compounding the required quantities of polychloroprene and bitumen in a Brabender rubber mixing head at 110°-120° C for 15 minutes to give a homogeous-looking mix. The mix was allowed to cool to below 100° C before the rest of the ingredients were incorporated.

Example 9 shows that addition of 150 parts of 150° softening point hardened extract (type A) to polychloroprene results in only a moderate reduction in tensile strength (12.2 MN/m$^2$ compared with 17.5 MN/m$^2$ for gum polychloroprene) while tear strength is improved to nearly twice the value shown by gum polychloroprene.

Example 10 shows that polychloroprene can be effectively and economically extended with 100 parts of type A hardened extract with 100° C softening point and 100 parts of Winnofil S, a finely divided calcium carbonate. Tensile properties were very similar to those of a gum polychloroprene while tear strength was improved. Brittle temperature was −30° C.

Example 11, in which polychloroprene was extended with an equal weight of 115/15 bitumen, gave a vulcanisate with good tensile and tear strength through elongation at break was reduced. The problem with this vulcanisate was that it became tacky on standing at room temperature and left brown stains on material in which it had been in contact. In contrast vulcanisates of polychloroprene and hardened extracts did not become tacky even after prolonged storage at room temperature and did not cause staining problems.

Example 12, in which 100 parts of polychloroprene was extended with 150 parts 115/15 bitumen, showed that the vulcanisate had very poor tensile and tear properties at this level of bitumen. In contrast example 9 demonstrated that when polychloroprene was extended with 150 parts hardened extract useful tensile and tear properties were still maintained.

The results of the above experiments together with information on the composition of the mixtures used are given in Table 2. In addition to the constituents set out in the Table each composition tested contained per 100 parts by weight of polychloroprene.

Nonox OD: 2.0 parts by weight
(Octylated diphenylamine antioxidant from ICI Ltd)
Magnesium oxide: 4.0 parts by weight
Zinc oxide: 5.0 parts by weight
Stearic acid: 0.5 parts by weight.

The compositions were all moulded into sheets and vulcanised at 160° C for 1 hour.

The abbreviations used in the Table are
PCP: polychloroprene
M: a mercaptan modified polychloroprene with a Mooney Viscosity $ML_1 + _4$ of 45 to 54.
SC: a peptised sulphur/chloroprene copolymer with a Mooney viscosity $ML_1 + _4$ of 45 to 54.
phr: parts per hundred of rubber (by wt.)
ET: Ethylene thiourea
S. Sulphur
DOTG: di-o-tolylguanidine
TTMS: tetramethyl thiuram monosulphide
Tb: brittle temperature, the temperature at which a 1 mm thick sheet of cured product snaps when bent through 180° round a ⅛ inch diameter rod.

Results on the vulcanisates show that up to 100 parts of 90° C softening point hardened extract can be incorporated into polychloroprene without significantly reducing tensile or tear properties though vulcanisates become brittle at −25° to −30° C, When 100parts of 170° C softening point hardened extract is incorporated into polychloroprene tear strength is improved from 33 N/mm for Example 8 (gum polychloroprene) to 43 N/mm, while tensile properties are almost the same as for the gum vulcanisate. Surprisingly the vulcanisate from example 7 has a brittle temperature of −35° C which is lower than that of a vulcanisate containing 100 parts of 90° C softening point hardened extract.

Example 13 illustrates the preparation of polychloroprene latex, the preparation of hardened extract emulsion and the isolation of solid polychloroprene incorporating hardened extract from a blend of the two emulsions.

PREPARATION OF POLYCHLOROPRENE LATEX

Recipe

Chloroprene: 3640g
BHT: 3.6g (2,6 ditert butyl p cresol)
Distilled Water: 3630ml
Sulphur: 20g
NaOH: 26g
Daxad 15: 31g (Sodium salt of polymerised alkyl naphthalene sulphonic acid)
Wood rosin: 182g
$Na_3PO_4 12H_2O$: 23g.

The above charge was emulsified and polymerised at 40° C using a solution containing potassium persulphate and "silver salt"(Sodium anthaquinone β sulphonate) as catalyst. At 76% conversion, polymerisation was short-stopped by adding 32 ml 10% DDD solution (dimethylammonium dimethyl dithiocarbamate) and 360g of a 16% emulsion of TETDS (tetraethylthiuram disulphide) was added. The latex was peptised for 4 hours at 40° C, and residual monomer was removed by steam stripping.

PREPARATION OF BLEND

An emulsion of hardened extract was prepared by ball milling the following charge:

50g hardened extract (cut into small pieces) Type B. HE90
5g Nansa SS acid (dodecylbenzene sulphonic acid)
45g water
0.4g sodium hydroxide 89.6g of the emulsion were stirred with 1280g of polychloroprene latex, giving a 10:1 w/w ratio of polychloroprene:hardened extract, the pH was reduced to 8 and the rubber blend was isolated as a film by freezing on the surface of a rotating drum immersed in the latex.

Table 2

| Other Materials phr | Ex. No. | PCP used 100 parts | Hardened Extract Softening Point °C | phr | Et phr | S | DOTG phr | TTMS phr | Shore A Hardness 15 secs. | Tensile strength MN/m2 | Elongation at Break % | Tear Strength N/mm | Rebound Resilience % | Tb °C |
|---|---|---|---|---|---|---|---|---|---|---|---|---|---|---|
| — | 1 | M | 90 | 50 | 0.5 | 1.0 | 0.5 | 0.5 | 29 | 17.3 | 880 | 39 | 32 | −45 |
| — | 2 | M | 90 | 100 | 1.0 | 1.0 | 0.5 | 0.5 | 26 | 16.0 | 880 | 27 | 7.5 | −25 |
| — | 3 | M | 90 | 200 | 1.0 | 1.0 | 1.0 | 1.0 | 20 | 10.1 | 1000 | 30 | 5.2 | −5 |
| — | 4 | M | 60 | 100 | 1.0 | 1.0 | 0.5 | 0. | 17 | 11.2 | 950 | 26 | 10.2 | −35 |
| — | 5 | S | 90 | 100 | 0.5 | — | — | — | 29 | 16.0 | 960 | 31 | 9 | −30 |
| — | 6 | M | 150 | 100 | 1.0 | 1.0 | 0.5 | 0.5 | 44 | 12.5 | 680 | 40 | 23 | −35 |
| — | 7 | S | 170 | 100 | 0.5 | — | — | — | 56 | 16.3 | 680 | 43 | 22 | −35 |
| — | 8 | M | — | — | 0.5 | — | — | — | 43 | 17.5 | 700 | 33 | 69 | −65 |
| — | 9 | S | 150 | 150 | 0.5 | — | — | 54 | 12.2 | 490 | 63 | | −25 | |
| Winofil S 100 | 10 | SC | 100 | 100 | 0.5 | — | — | — | 53 | 16.4 | 900 | 55 | | −30 |
| 115/5 Bitumen 100 | 11 | C | — | — | 0.5 | — | — | — | 49 | 18.2 | 400 | 42 | | −40 |
| 115/15 Bitumen 150 | 12 | SC | — | — | 0.5 | — | — | — | 43 | 6.2 | 620 | 23 | 22 | −30 |

Examples 1–7 used the hardened extract of type B described in Table 1 and examples 9 and 10 type A

I claim:

1. A vulcanizable composition comprising polychloroprene and 3 to 300 parts by weight, per 100 parts of polychloroprene of hardened extract obtained by blowing air at an elevated temperature into a solvent extract of a distillate petroleum fraction boiling in the lubricating oil boiling range and containing a major proportion of aromatic hydrocarbons, said hardened extract having a saturated hydrocarbon content of not more than 10% by weight.

2. A vulcanisable composition according to claim 1 which contains a vulcanisation agent.

3. A composition according to claim 1 wherein the hardened extract has a softening point in the range of 50°–200° C.

4. A composition according to claim 3 wherein the softening point in the range 85°–170° C.

5. The composition according to claim 3 wherein thhe content of asphaltenes plus toluene insolubles in the hardened extract is at least 20% by weight.

6. The composition according to claim 1 wherein the polychloroprene is a polymer made from a monomeric material containing not more than 15%, by weight of total monomeric material, of comonomer.

7. The composition according to claim 6 wherein the polychloroprene rubber has a Mooney viscosity (ML1 + 4) from 30 to 120.

8. A composition according to claim 7 wherein the Mooney viscosity is in the range 35 to 55.

9. A composition according to claim 1 which contains more than 100 parts of hardened extract per 100 parts of polychloroprene.

10. A composition according to claim 9 which contains 120 to 200 parts of hardened extract per 100 parts of polychloroprene.

11. A composition according to claim 3 which contains not more than 150 parts by weight hardened extract per 100 parts by weight of polychloroprene.

12. A composition according to claim 4 wherein the hardened extract and the polychloroprene are mixed together at a temperature in the range 80° C to 140° C.

13. A vulcanisable composition according to claim 1 comprising sulphur and a vulcanisation accelerator.

14. A vulcanisable composition according to claim 13 comprising ethylene thiourea.

15. A vulcanisable composition according to claim 13 wherein the polychloroprene is a mercaptan or xanthogen-modified polychloroprene.

16. A vulcanised article produced from a composition according to claim 2 the composition containing a vulcanisation system by a forming operation and heating step.

* * * * *